United States Patent
Belin (10) Patent No.: US 11,879,548 B2
(45) Date of Patent: Jan. 23, 2024

(54) SUBASSEMBLY FOR DOUBLE-DOOR TRANSFER SYSTEM WITH SIMPLIFIED MANUFACTURE

(71) Applicant: GETINGE LA CALHENE, Vendome (FR)

(72) Inventor: Jean Belin, Lunay (FR)

(73) Assignee: GETINGE LIFE SCIENCE FRANCE, Vendôme (FR)

( * ) Notice: Subject to any disclaimer, the term of this patent is extended or adjusted under 35 U.S.C. 154(b) by 253 days.

(21) Appl. No.: 17/208,264

(22) Filed: Mar. 22, 2021

(65) Prior Publication Data

US 2021/0293337 A1 Sep. 23, 2021

(30) Foreign Application Priority Data

Mar. 23, 2020 (FR) ...................................... 2002812

(51) Int. Cl.
*F16J 15/32* (2016.01)
*B29C 45/14* (2006.01)
*B65D 90/62* (2006.01)
*F16J 15/3284* (2016.01)
*B29L 31/00* (2006.01)

(52) U.S. Cl.
CPC ......... *F16J 15/32* (2013.01); *B29C 45/14336* (2013.01); *B65D 90/623* (2013.01); *F16J 15/3284* (2013.01); *B29L 2031/712* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/3284; F16J 15/3288; F16J 15/3292; B29C 45/00; B29C 45/14; B29C 45/14336; B29C 45/14344; B29C 45/14352; B29C 45/14368; B65D 90/00; B65D 90/62; B65D 90/623; B29L 2031/00; B29L 2031/712
USPC ........................................................ 292/256.6
See application file for complete search history.

(56) References Cited

U.S. PATENT DOCUMENTS

| 5,421,626 | A | 6/1995 | Glachet | |
|---|---|---|---|---|
| 2012/0145715 | A1* | 6/2012 | Saint Martin | ............ F16J 13/08 220/826 |

(Continued)

FOREIGN PATENT DOCUMENTS

| FR | 2695343 A1 | 3/1994 |
|---|---|---|
| WO | 2011023906 A1 | 3/2011 |
| WO | 2017109420 A1 | 6/2017 |

OTHER PUBLICATIONS

Search Report issued in French Patent Application No. 2002812 dated Nov. 10, 2020.

*Primary Examiner* — Nathan Cumar
(74) *Attorney, Agent, or Firm* — Pearne & Gordon LLP (57) ABSTRACT

Subassembly fora double-door leaktight connection system between two closed spaces, the system including two flanges able to be secured to each other, and two doors each normally closing an opening delimited by a flange, the subassembly including a flange and a seal, the seal being intended to provide leaktight contact between the flange and the seal, between the seal and the other flange of the connection system and between the seal and the door closing the opening of the flange, the flange including a groove and the seal being a part moulded onto the flange and being partly received in the groove.

19 Claims, 5 Drawing Sheets

(56) References Cited

U.S. PATENT DOCUMENTS

2014/0150924 A1\* 6/2014 Nodin ................... B01L 1/02
  141/311 A
2018/0369801 A1\* 12/2018 Pallares ................ B25J 21/02

\* cited by examiner

FIG.9

SUBASSEMBLY FOR DOUBLE-DOOR TRANSFER SYSTEM WITH SIMPLIFIED MANUFACTURE

CROSS-REFERENCE TO RELATED APPLICATIONS

This application claims priority to French Patent Application No. 2002812 filed on Mar. 23, 2020, the entire content of which is incorporated by reference herein.

TECHNICAL FIELD AND PRIOR ART

The present invention relates to a subassembly for a double-door transfer system with simplified manufacture.

In a certain number of industrial sectors, among which mention will be made of the nuclear, medical, pharmaceutical and food sectors, it is necessary or desirable to perform certain tasks in a confined atmosphere, in order to protect the environment, for example from radioactivity, from toxicity, etc., or on the contrary to be able to perform these tasks in an aseptic atmosphere or an atmosphere free from dust, or finally both simultaneously.

Transferring equipment or products from one closed space to another, without at any time the leaktightness of each of these spaces with respect to the outside being broken, poses a problem that is tricky to meet. This problem can be resolved by a double-door connection device.

Such a double-door device provided with a multiple-protection control is for example known from the document FR 2 695 343. Each space is closed by a door mounted in a flange. Each door is secured to the flange thereof by a bayonet connection and the two flanges are intended to be secured to each other by a bayonet connection.

For example, one of the closed spaces is formed by an isolator and the other space is formed by a container.

Conventionally, the connection part carried by the isolator is designated the alpha part and the connection part carried by the container is designated the beta part.

The beta part may equip a rigid container, a bag or a sheath referred to as "tubing", for example for discharging waste. The tubing is a flexible sheath generally of great length, which may be as much as 30 metres, folded on itself around a rigid body. It includes a beta part mounted on the rigid body. The flexible sheath is gradually unfolded to the required length, and then welded and cut. The tubing makes it possible to transfer waste or objects to the outside of the isolator, semicontinuously, without breaking the leaktightness.

Seals are provided on the alpha part and on the beta part in order to ensure leaktightness between the connected spaces.

The beta flange includes a groove wherein a bead of the seal of the beta part is received.

The seal of the beta part is intended to ensure at the same time:
  leaktightness between the flange of the beta part and the door of the beta part,
  leaktightness between the beta flange and the alpha flange, and
  leaktightness between the beta flange and the bead of the seal.

The assembly of the bead of the seal in the groove of the flange is important since it is particularly on it that the leaktightness between the bead and the flange depends. The assembly operation is tricky, since the bead may twist during assembly.

The assembly operation may therefore be difficult and lengthy, which increases the production costs. Furthermore, in the case of an application in the pharmaceutical field, the bags or containers equipped with the beta part are manufactured in a clean room, which makes assembling the seal in the flange even more complex.

Furthermore, there is a risk that the seal may escape from the groove, in particular during an autoclaving cycle. The flange must therefore be designed to prevent this phenomenon.

DESCRIPTION OF THE INVENTION

Consequently an aim of the present invention is to offer a subassembly for a double-door transfer system with simplified manufacture.

The aim stated above is achieved by a subassembly for a double-door transfer system including a flange intended to be closed by a door and a leaktightness seal secured to the flange, the subassembly being at least partly produced by overmoulding.

There is then no longer any operation of assembling the seal in the flange, and the risk of non-conforming assembly is therefore eliminated. The time taken for manufacturing a beta part is then reduced. The risks of leakage are also reduced.

In one example, the flange is produced in advance and includes a groove, and the seal is then moulded onto the flange. Highly advantageously, the groove includes in the bottom thereof through passages through which the material of the seal can flow, providing improved anchorage of the seal on the flange.

In an advantageous example, an O-ring seal is mounted gripped on the radially inner wall of the grove of the flange prior to assembly, which further improves the leaktightness between the flange and the seal.

In another example embodiment, the seal is produced in advance and the flange is moulded onto the seal.

One subject-matter of the present application is therefore a subassembly for a double-door leaktight connection system between two closed spaces, said system comprising two flanges able to be secured to each other, and two doors each normally closing an opening delimited by a flange, said subassembly including a flange and a seal, said seal being intended to provide a leaktight contact between the flange and the seal, between the seal and the other flange of the connection system and between the seal and the door closing the opening of said flange, the seal and the flange being a part moulded onto the flange or the seal respectively.

In an advantageous example, the flange includes a groove surrounding the central opening thereof, said groove housing a portion of the seal.

For example, the flange includes at least one channel so that the material of the seal extends between the inside of the flange and the radially outer surface of the flange.

Advantageously, at least one channel connects the inside of the groove to the radially outer surface of the flange.

In one example, the material of the seal on the radially outer surface of the flange may form a ring completely surrounding the flange.

In another example, the material of the seal on the radially outer surface of the flange forms a sleeve completely surrounding the flange.

Preferably, the subassembly includes at least one O-ring seal mounted gripped on a radially inner longitudinal wall of the groove, the seal being moulded onto the flange and the O-ring seal. Advantageously, the seal and the O-ring seal are produced from the same material.

For example, the flange is made from thermoplastic polymer and the seal is made from thermosetting polymer or thermoplastic polymer.

Another subject-matter of the present application is a transfer device for a double-door leaktight connection system including a subassembly according to the invention, and a container sealingly secured to the flange.

In one example, the container is rigid and is in a single piece with the flange.

In another example, the container is flexible and is attached to the flange. The flexible container may be a sheath.

Another subject-matter of the present application is a method for manufacturing a subassembly according to the invention, including:
providing a flange,
fitting a mould on the flange defining with the flange the final form of the seal,
injecting the plastics material of this seal into the mould and into and/or onto the flange,
hardening said material,
ejecting the subassembly from the mould.

The manufacturing method may include the manufacture of the flange by moulding thermoplastic material.

Another subject-matter of the present application is a method for manufacturing a subassembly according to the invention including:
providing a seal, fitting a mould on at least part of the seal, defining with the seal the final form of the flange,
injecting the plastics material of the flange into the mould and into and/or onto the seal,
hardening said material,
ejecting the subassembly from the mould.

The method may include manufacturing the seal by moulding thermoplastic or thermosetting polymer material.

Another subject-matter of the present application is a manufacturing method by bi-injecting a subassembly according to the invention, including:
providing at least one mould defining the final external form of the subassembly,
injecting into the mould a first material of the flange or of the seal,
hardening said first material,
injecting into the mould a second material of the seal or of the flange,
hardening said second material,
ejecting the subassembly from said mould.

BRIEF DESCRIPTION OF THE DRAWINGS

The present invention will be understood better on the basis of the following description and the accompanying drawings, on which.

DETAILED DESCRIPTION OF PARTICULAR EMBODIMENTS

Figure 1:
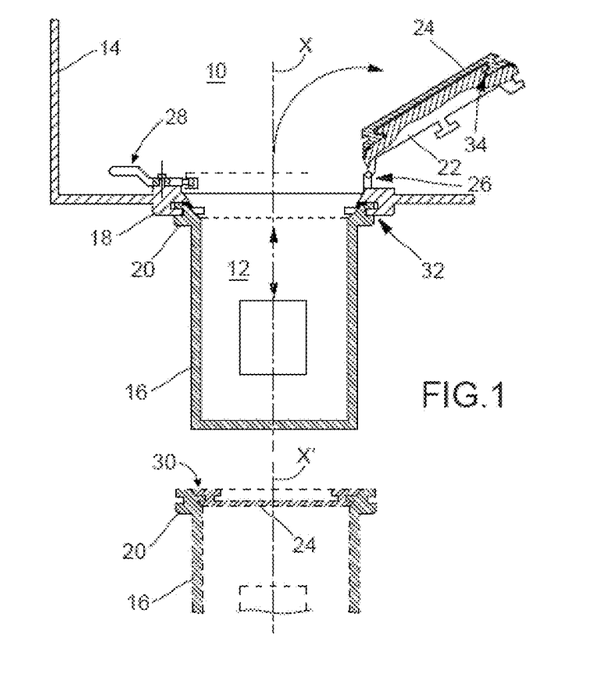
FIG. 1 is a view in longitudinal section illustrating schematically the connection of a container on a cell by means of a double-door leaktight transfer device by means of the bayonet type.

FIG. 1 shows a schematic representation of an example of a double-door transfer system.

In the following description the two closed spaces the leaktightness of which it is wished to test before connection thereof correspond respectively to an isolator and to a container 12. It will be understood however that the invention is also applicable in the case where the closed spaces would non-limitatively be for example in one case a glovebox and in the other case a container or a glovebox.

The isolator 10 is delimited by a wall 14 only a portion of which is visible in FIG. 1. It is equipped, conventionally, for example with remote manipulation means such as remote-handling devices and/or gloves (not shown) secured to the wall 14, by means of which the centralised control mechanism can be manoeuvred from inside this cell 10. The container 12 is also delimited by a wall 16, as illustrated in particular by FIG. 1.

The double-door leaktight transfer device mainly comprises an isolator flange 18, a container flange 20, an isolator door 22 normally closing off a circular opening delimited by the isolator flange 18, and a container door 24 normally closing off an opening delimited by the container flange 20. The isolator flange 18 and the container flange 20 are attached respectively to the wall 14 of the cell 10 and to the wall 16 of the container 12. In this example, the door of the isolator 22 is hinged on the isolator flange 18 by a hinge 26.

Means designated generally by the reference 28 make it possible to control the opening and closing of the doors 22 and 24.

For example, the container door 24 is attached to the container flange 20 by a bayonet connection 30 as described in the document FR 2 695 343. For example, to enable the container flange 20 to be secured to the isolator flange 18 and the container door 24 to be secured to the isolator door 22, the double-door leaktight transfer system also comprises two other bayonet connections designated respectively by the references 32 and 34. The three bayonet connections 30, 32 and 34 are arranged so that, after the container flange 20 is placed up against the isolator flange 18, a rotation of the container 12 about the axis thereof, for example in the clockwise direction, has the effect of securing together the container flange 20 and the isolator flange 18, securing together the container door 24 and the isolator door 22, and disconnecting the container door 24 from the container flange 20. These last two operations take place consecutively, so that the opening of the container occurs only after the container door 24 has been disconnected from the isolator door 22 in order to form a double door.

The assembly formed by the isolator flange and the isolator door is normally referred to as the "alpha part". The assembly formed by the container flange and the container door is normally referred to as the "beta part".

In general, the double-door transfer system has symmetry of revolution about the axis X, which is the axis of the isolator flange.

Figure 2:
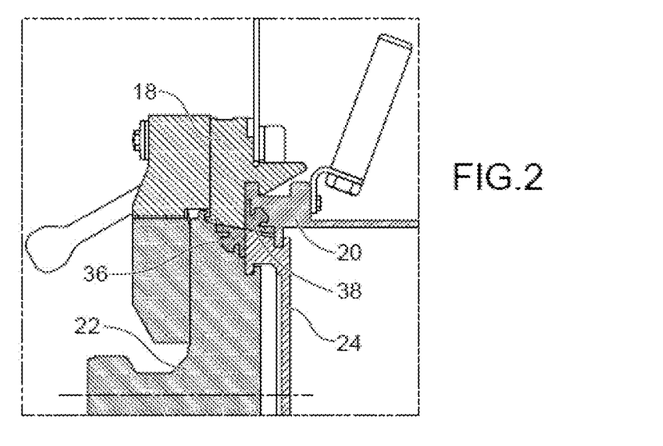
FIG. 2 is a view in cross section of the double-door connection system, a beta part of the prior art being mounted on the alpha part.

FIG. 2 shows a detail view of the double-door system in the locking phase, the beta part being mounted on the alpha part. The alpha part includes a seal 36 mounted on the periphery of the isolator door 22. The seal 36 is in contact with the alpha flange and the container door of the beta part. The beta part includes a seal 38 mounted on the flange 20 bordering the opening closed by the container door 24. The seal 38 is in contact with the container door 24 of the beta part and the front face of the isolator flange 18.

The invention applies in particular to the beta parts comprising for example a rigid container, a flexible bag or a sheath.

Figure 3A:
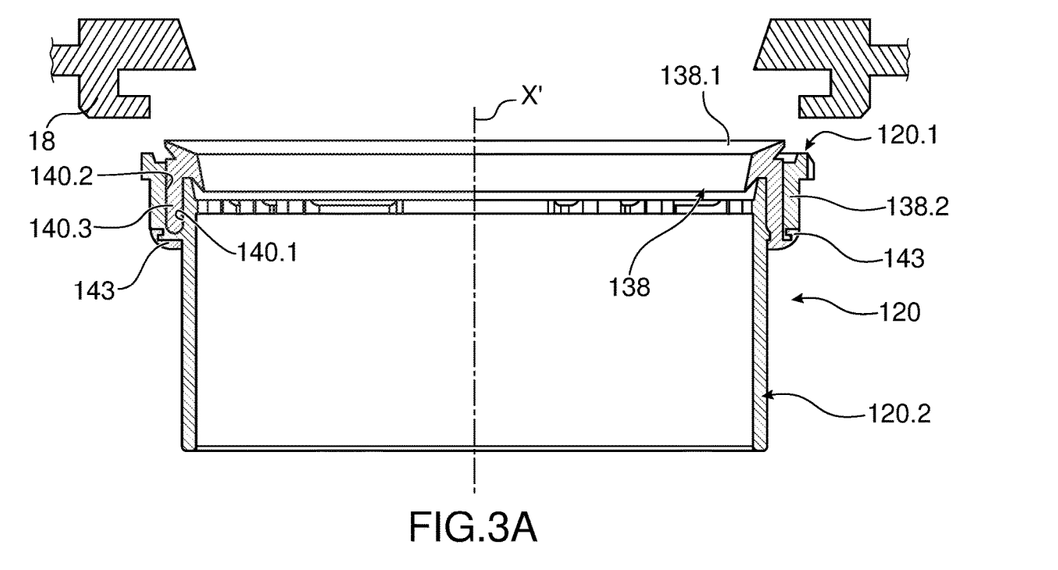
FIG. 3A is a view in longitudinal section of an example embodiment of a subassembly of a beta part according to the invention.
Figure 3B:
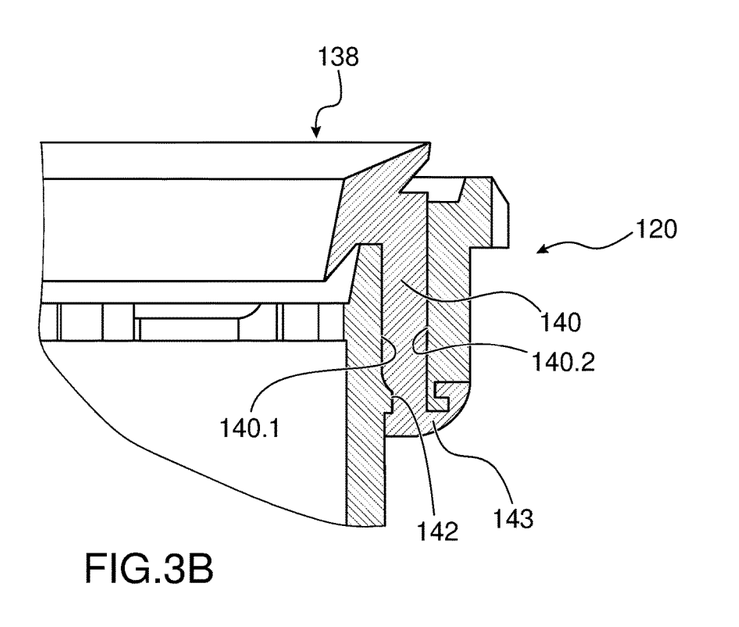
FIG. 3B is a detailed view of FIG. 3A.
Figure 4:
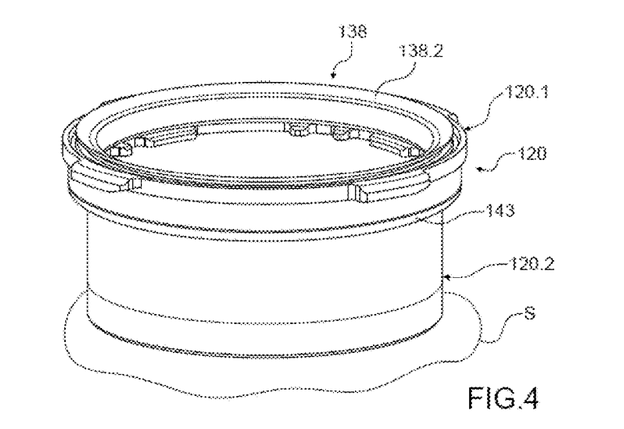
FIG. 4 is a perspective view of the subassembly of FIG. 3A.
Figure 5:
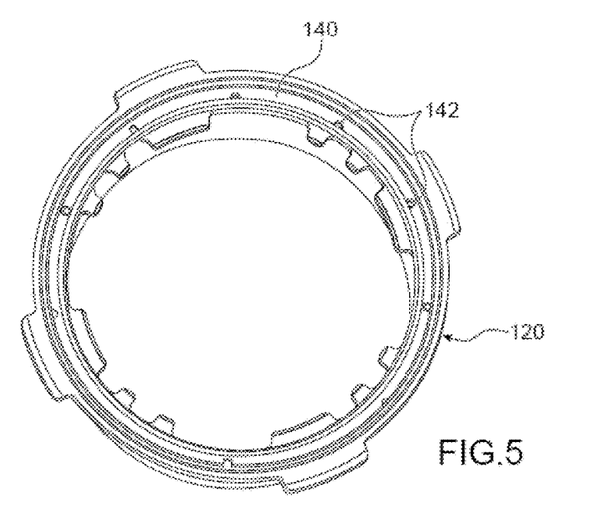
FIG. 5 is a perspective plan view of the flange of the subassembly of FIG. 3A, without the seal.

FIG. 3A shows a view in longitudinal section of an example embodiment of a flange 120 and of a seal of a beta part according to the invention, forming a beta-part subassembly, and FIG. 3B shows a detail view of FIG. 3A. FIG. 4 shows the flange of FIG. 3A seen in perspective without the door. FIG. 5 shows the flange before moulding of the seal thereon.

In this example, the connection between the door 124 and the flange 120 is a bayonet connection, and the connection between the flange 120 and the alpha part is also of the bayonet type. These connections are in no way limitative. Connection means by snapping on or clamping are also applicable.

The flange 120 has a form of revolution about the axis X'.

The flange 120 includes a first portion 120.1 comprising the connection means of the alpha part and the means cooperating with the door (not shown) to provide leaktight mounting thereof in the flange 120, and a second portion 120.2, tubular in form in the example shown, extending the first portion 120.1 and intended for attaching the container, which may be rigid in the case of a rigid container or flexible in the case of a bag, or for attaching a sheath, for example in order to produce tubing. In FIG. 4, a bag S attached to the second portion 120.2 of the flange 120 is shown schematically.

The flange 120 carries a seal 138 intended to provide leaktightness both between the flange 120 and the door 124, and between the flange 120 and the alpha part.

The flange 120 includes a groove 140 formed in the first part 120.1, surrounding the opening of the container flange 120. The groove 140 emerges in the face intended to be in contact with the alpha part. The groove 140 includes a radially inner wall 140.1, a radially outer wall 140.2 and a bottom 140.3.

The radially inner wall 140.1 and the radially outer wall 140.2 provide the positioning of the seal 138 with respect to the door 14.

The seal 138 is annular in shape and includes a first portion 138.1 housed in the groove and a second portion 138.2 projecting from the groove and intended to come radially into contact with the door and longitudinally into contact with the flange of the isolator.

In the example shown and advantageously, the bottom 140.3 of the groove 140 is pierced with holes 142 passing through the bottom 140.3 and emerging towards the outside (FIG. 5). In one example, the seal 138 is produced by moulding onto the flange. The material of the seal is injected partly into the groove. In this example, the material of the seal 138 flows through the holes 142 in the bottom 140.3 and forms a ring 143 surrounding the second portion 120.2 of the flange. The anchoring of the seal on the flange is then substantially increased.

In the example shown, the groove 140 includes tubular concentric walls 140.1 and 140.2. In a variant, the walls and/or the bottom have shapes favouring the attachment of the material of the seal in the groove and improving leaktightness.

By way of example, the beta flange is produced from plastics material, advantageously thermoplastic, such as PE (polyethylene), PC (polycarbonate), PSU (polysulfone), PP (polypropylene), styrene acrylic copolymers, for example sold under the name Zylar®, POM (polyoxymethylene), PET-G (glycolised polyethylene terephthalate), PVDF (polyvinylidene fluoride), ABS (acrylonitrile butadiene styrene), or PBT (polybutylene terephthalate).

The seal 138 is preferably produced from elastomer, for example thermosetting silicone, thermosetting EPDM (ethylene propylene diene monomer) thermosetting LSR (liquid silicone resin), thermoplastic elastomer, or PVC (polyvinyl chloride).

Preferably, the selection of the materials for producing the flange and the seal is such that a chemical bond may appear between the material of the seal and that of the flange. For example, the flange is produced from PVC and the seal is produced from PVC. According to another example, the flange is produced from a material containing styrene, for example Zylar® or ABS (acrylonitrile butadiene styrene) or polystyrene and the seal is produced from thermoplastic styrene elastomer (TEP-S). According to another example, the flange is produced from polyethylene and the seal from non-vulcanised thermoplastic olefinic elastomer (TEP-O). According to another example, the flange is produced from polypropylene and the seal is produced from vulcanised thermoplastic olefinic elastomer (TEP-V). According to another example, the flange is produced from polyurethane and the seal is produced from thermoplastic polyurethane elastomer (TEP-U). According to another example, the flange is produced from polyester, for example from glycolised polyethylene terephthalate (PET-G) or from polybutylene terephthalate (PBT), and the seal is produced from thermoplastic copolyester (TPE-E).

Examples of a manufacturing method will be described.

A first example of a manufacturing method includes:
providing a beta flange 120,
placing a mould (not shown) on the flange 120 defining with the groove the complete form of the seal,
overmoulding the seal by injecting material of the seal into the mould and the groove 140,
solidifying the seal 138, for example by heating in the case of a thermosetting material, at a temperature at least equal to the crosslinking temperature. The material of the flange is then chosen so as to be capable of withstanding the crosslinking temperature.

For example, the flange is made from polyethylene and the seal is made from silicone.

In this example, the flange advantageously forms a part of the mould of the seal.

In the example in FIG. 3A, wherein the groove 140 is provided with holes 142 in the bottom 140.3 thereof, the mould is such that it extends beyond the holes in order to contain the material passing through the holes and thus define the form of the part of the seal situated remote from the portion 138.2 projecting from the groove.

The flange 120 can be produced by moulding, for example thermoplastic. Advantageously, in the case of the production of a container, the flange and the container are produced by moulding in a single piece. In the case of a bag, the bag is for example attached to the flange, for example by welding, or is moulded onto the flange.

A second example of a manufacturing method includes:
providing the seal,
placing the seal in a mould of the flange,
injecting the material of the flange into the mould so as to mould the flange onto the seal,
hardening the material of the flange.

The seal is for example produced by moulding.

The seal, in particular the first portion of the seal, preferably has a form favouring the anchoring of the flange on the seal and leaktightness between the flange and the seal. This second example has the advantage of being able to implement a seal the first part of which has a complex form that is particularly favourable to good anchoring of the flange.

In this example, it can be envisaged that the first part of the seal includes through channels enabling the material of the flange to flow through them and thus to form anchorings through the seal.

The moulds used are for example moulds made from steel or aluminium alloy.

In another example, the flange and the seal may be produced by bi-material injection, the material of the flange being injected into a tool defining the form of the flange, and then the material of the seal is injected into the same tool.

There are various bi-injection moulding techniques applicable to the production of the subassembly according to the invention using different mould types. For example, one of these techniques uses transfer moulds, wherein the part is transferred manually or by robot into the same mould for the second injection. Another of these techniques uses moulding with a rotary platen, during which the mould, which is partly movable, makes a rotation of 180° in order to place the first moulding in the cavity of the second material. This rotation is provided by the platens of the press. Another technique uses rotary-base moulding, which uses the same principle as the rotary-platen mould but for which the rotation mechanism is in the mould. The partly movable cavity emerges from the frame, and rotates by a half-turn before returning into its housing. Another of these techniques uses a slidecam mould or sliding-gate mould, wherein the space for the second injection is released by a movement of the core.

Manufacturing the flange of the beta part equipped with the seal according to the invention is quicker than according to the methods of the prior art. Furthermore, the risks of mounting the seal causing a defect in leaktightness are eliminated. In addition, the risks of ejection of the seal out of the flange are also eliminated.

The invention also makes it possible to avoid having to manage stocks of parts to be assembled.

Figure 6:
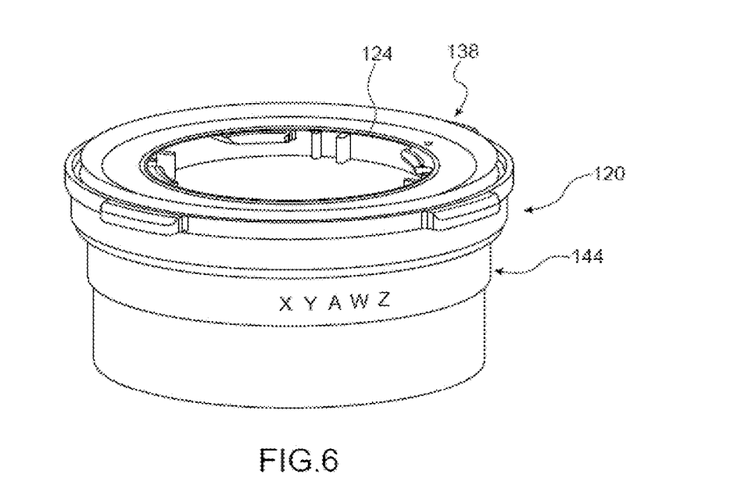
FIG. 6 is a perspective side view of a variant of the subassembly of FIG. 3A.

FIG. 6 shows a variant embodiment of the flange and seal assembly of FIG. 3A, wherein the moulding is such that the material of the seal beyond the holes 142 forms a sleeve 144 covering a portion of the second portion 120.2. The container door 124 closing the central passage of the flange is shown.

The sleeve 144 increases the anchoring of the seal on the flange and can serve as a support for text, for example the model of the beta part and/or the date of manufacture. The text may be hollow and/or in relief and produced directly during moulding or overmoulding and/or be attached for example by printing.

Figure 7:
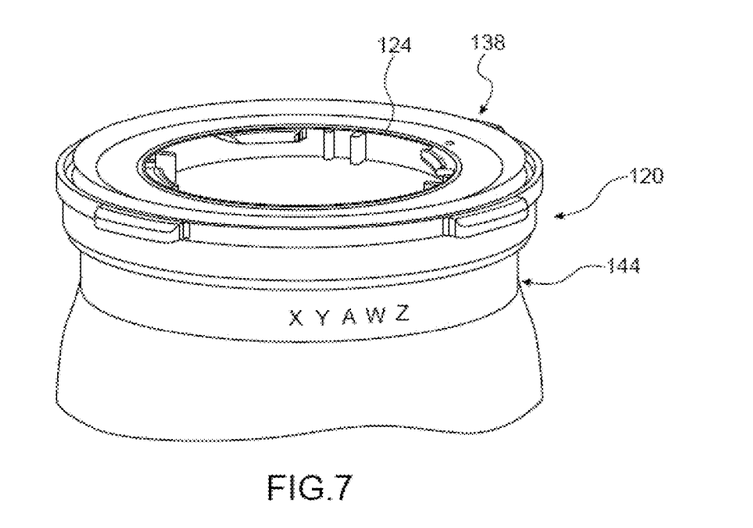
FIG. 7 is a perspective view of another example of a subassembly according to the invention.

FIG. 7 shows an advantageous example embodiment of the flange and sleeve assembly of FIG. 6, wherein a bag S is welded directly onto the sleeve 144. In a variant, the bag is welded onto the ring 143 (FIGS. 3A and 3B).

This example embodiment simplifies the container and therefore the production method, not only in relation to the material of the flange since it no longer requires compatibility of material between the second portion 120.2 of the flange and the bag S, but also in relation to the form of the flange since the second portion 120.2 of the flange can be substantially shortened.

For example, the seal is produced from thermoplastic elastomer and the bag is produced from the polymer of the same family. By way of example, the seal is produced from thermoplastic polyethylene elastomer (TPE-E) and the bag is produced from polyethylene (PE). According to another example, the seal is produced from thermoplastic polyurethane elastomer (TPE-U) and the bag is produced from polyurethane (PU).

Figure 8:
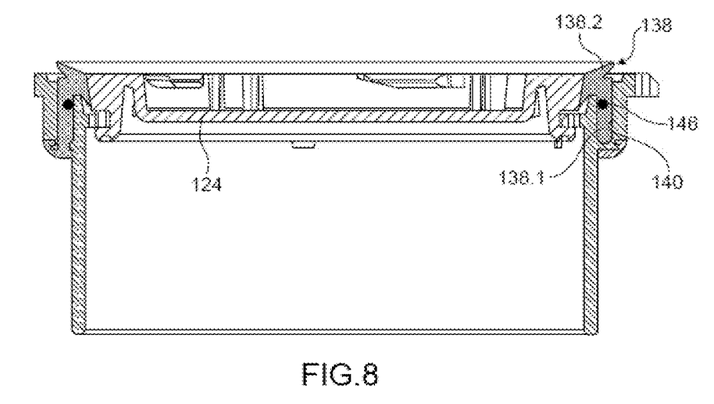
FIG. 8 is a view in longitudinal section of another example of a subassembly according to the invention.

FIG. 8 shows another advantageous example of a beta flange provided with its seal having further improved leaktightness between the seal and the flange.

In this example, an O-ring seal 146 is mounted in the groove. The O-ring seal 146 is mounted clamped against the radially inner wall of the groove. The seal is then moulded onto the flange and onto the O-ring seal.

Preferably, the O-ring seal 146 and the overmoulded seal are produced from the same material.

The use of an O-ring seal makes it possible to improve the leaktightness between the seal and the flange. The O-ring seal exerts a permanent compression force on the flange, which makes it possible to maintain leaktightness. If a leakage passage formed between the seal and the flange, it would be interrupted by the O-ring seal.

A plurality of O-ring seals may be used at various longitudinal locations in the groove.

The flange and seal subassembly of the alpha part and/or the door and seal subassembly of the alpha part may also be produced by overmoulding.

In the same way, if the door of the beta part required a seal, the door and seal subassembly could be produced by overmoulding.

The use of overmoulding makes it possible to avoid the operation of assembling the seal on the flange, which may damage the seal and lead to a lack of leaktightness and therefore to a rejection of the beta part.

The manufacturing time is reduced and the manufacturing is more reliable. Furthermore, this technique makes it possible to respond more easily to the requirements related to controlled atmospheres such as the particle level and the microbial load, in the case of clean-room manufacture.

Furthermore, the beta part thus obtained is more reliable because of the anchoring of the seal in the flange, better holding of the seal in the flange is obtained and the leaktightness between the seal and the flange thereof is reinforced.

The risk of ejection of the seal found with the beta parts of the prior art during the autoclaving phase is eliminated. The means used for reducing the risk of ejection can be omitted, which reduces the complexity of the flange.

Figure 9:
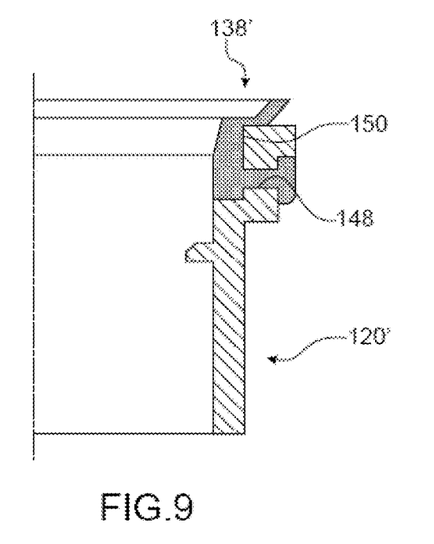
FIG. 9 is a detail view in longitudinal section of another example of a subassembly according to the invention.

According to another example embodiment shown in FIG. 9, the flange 120' does not include a groove but only a countersink 150 bordering the opening of the flange. In this example, through radial channels 148 are formed in the flange 120' and provide the anchoring of the seal 138' on the flange. This variant simplifies the form of the portion 120.1 of the container flange and therefore the design of the flange mould.

The invention claimed is:

1. A subassembly for a double-door leaktight connection system between two closed spaces, said double-door leaktight system comprising first and second flanges able to be secured to each other, and first and second doors each normally closing an opening delimited by the first and second flanges, respectively, said subassembly including the first flange and a seal, said seal being intended to provide a leaktight contact between the first flange and the seal, between the seal and the second flange of the connection system and between the seal and the first door closing the opening of said first flange, the seal or the first flange being a part moulded onto the first flange or the seal respectively, wherein the first flange includes at least one channel so that a material of the seal extends between an inside of the first flange and a radially outer surface of the first flange.

2. The subassembly according to claim 1, wherein the first flange includes a groove surrounding the opening delimited thereby, said groove housing a part of the seal.

3. The subassembly according to claim 2, wherein at least one channel connects an inside of the groove to the radially outer surface of the first flange.

4. The subassembly according to claim 2, further including at least one O-ring seal mounted clamped on a radially inner longitudinal wall of the groove, the seal being moulded onto the first flange and the O-ring seal.

5. The subassembly according to claim 4, wherein the seal and the O-ring seal are produced from the same material.

6. The subassembly according to claim 1, wherein the material of the seal on the radially outer surface of the first flange forms a ring completely surrounding the first flange.

7. The subassembly according to claim 1, wherein the material of the seal on the radially outer surface of the first flange forms a sleeve completely surrounding the first flange.

8. The subassembly according to claim 1, wherein the first flange is made from thermoplastic polymer and the seal is made from thermosetting polymer or thermoplastic polymer.

9. A method for manufacturing the subassembly according to claim 8, including:
providing a the first flange,
placing a mould on the first flange defining with the first flange a final form of the seal,
injecting the material of the seal into the mould and into and/or onto the first flange,
hardening said material, and
ejecting the subassembly from the mould.

10. The method according to claim 9, including the manufacture of the first flange by moulding thermoplastic material.

11. The method according to claim 9, wherein the material of the seal comprises plastics.

12. A transfer device for a double-door leaktight connection system including the subassembly according to claim 1, and a container sealingly secured to the first flange.

13. The transfer device according to claim 12, wherein the container is rigid and is in a single piece with the first flange.

14. The transfer device according to claim 12, wherein the container is flexible and is attached to the first flange.

15. The transfer device according to claim 14, wherein the container is a sheath.

16. A method for manufacturing the subassembly according to claim 1, including:
providing the seal,
placing a mould on at least a portion of the seal, defining with the seal a final form of the first flange,
injecting a material of the first flange into the mould and into and/or onto the seal,
hardening said material of the first flange, and
ejecting the subassembly from the mould.

17. The method according to claim 16, including the manufacture of the seal by moulding thermoplastic or thermosetting polymer material.

18. The method according to claim 16, wherein the material of the first flange comprises plastics.

19. A method for manufacturing, by bi-injection, the subassembly according to claim 1, including:
providing at least one mould defining a final external form of the subassembly,
injecting into the mould a first material of the first flange or of the seal,
hardening said first material,
injecting into the mould a second material of the seal or of the first flange,
hardening said second material, and
ejecting the subassembly from said mould.

* * * * *